United States Patent
Johnson et al.

(10) Patent No.: US 12,455,916 B2
(45) Date of Patent: Oct. 28, 2025

(54) PERSONALIZED CENSORSHIP OF DIGITAL CONTENT

(71) Applicant: DISNEY ENTERPRISES, INC., Burbank, CA (US)

(72) Inventors: Alexis Johnson, Glendale, CA (US); Sonia Doshi, Los Angeles, CA (US); Alexander Niedt, Loma Linda, CA (US); Rebecca Bever, Burbank, CA (US); Mara Lucien, Los Angeles, CA (US); Paige Townsend, La Crescenta, CA (US); Lori L. Huck, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 16/996,857

(22) Filed: Aug. 18, 2020

(65) Prior Publication Data
US 2022/0058215 A1    Feb. 24, 2022

(51) Int. Cl.
*G06F 16/435* (2019.01)
*G06F 16/438* (2019.01)
*G06F 16/483* (2019.01)
*H04N 21/454* (2011.01)

(52) U.S. Cl.
CPC .......... *G06F 16/437* (2019.01); *G06F 16/438* (2019.01); *G06F 16/483* (2019.01); *H04N 21/4542* (2013.01)

(58) Field of Classification Search
CPC ..... G06F 16/437; G06F 16/438; G06F 16/483
USPC ....................................................... 707/734
See application file for complete search history.

(56) References Cited

U.S. PATENT DOCUMENTS

| | | |
|---|---|---|
| 8,819,263 B2 | 8/2014 | Jarman et al. |
| 9,363,561 B1 | 6/2016 | Harmon et al. |
| 2005/0022229 A1* | 1/2005 | Gabriel .............. H04N 21/4532 725/136 |
| 2009/0222849 A1* | 9/2009 | Peters .............. H04N 21/44016 725/28 |
| 2011/0161999 A1 | 6/2011 | Klappert et al. |
| 2012/0064874 A1 | 3/2012 | Pierce, Jr. et al. |

(Continued)

OTHER PUBLICATIONS

Federal Communications Commission, "Obscene, Indecent and Profane Broadcasts", https://www.fcc.gov/consumers/guides/obscene-indecent-and-profane-broadcasts, 3 pages, Jan. 13, 2021.

*Primary Examiner* — Kimberly L Wilson
(74) *Attorney, Agent, or Firm* — Squire Patton Boggs LLP; Sarah Mirza

(57) ABSTRACT

Various embodiments set forth systems and techniques for personalizing censorship of digital content. The techniques include generating, based on a user characteristic, a censorship profile associated with a user, wherein the censorship profile identifies a censorship element; determining a censorship feature associated with the censorship element, wherein the censorship feature is to be activated during playback of digital content that includes the censorship element; identifying, based on temporal boundaries data and temporal facet data associated with a digital content item, one or more portions of the digital content item that include at least one element matching the censorship element; and activating the censorship feature during playback of the one or more portions of the digital content item.

18 Claims, 6 Drawing Sheets

(56) References Cited

U.S. PATENT DOCUMENTS

| | | |
|---|---|---|
| 2012/0216222 A1 | 8/2012 | Candelore |
| 2013/0272672 A1 | 10/2013 | Padro et al. |
| 2014/0040189 A1 | 2/2014 | Cuttner |
| 2014/0208340 A1* | 7/2014 | Poornachandran ......................... H04N 21/4751 725/10 |
| 2014/0237082 A1 | 8/2014 | Chen et al. |
| 2015/0070516 A1* | 3/2015 | Shoemake ....... H04N 21/44008 348/207.11 |
| 2015/0206220 A1* | 7/2015 | Musat ................ G06Q 30/0631 705/26.7 |
| 2016/0037217 A1 | 2/2016 | Harmon et al. |
| 2019/0066279 A1* | 2/2019 | Monkarsh ............. H04L 67/306 |
| 2020/0077144 A1* | 3/2020 | Zavesky ............. H04N 21/4431 |
| 2020/0366959 A1* | 11/2020 | Pau ................... H04N 21/23418 |
| 2021/0058402 A1* | 2/2021 | Onyekwelu ........... H04L 63/105 |
| 2021/0073264 A1* | 3/2021 | Vaughn ................. G06F 16/483 |
| 2021/0142828 A1* | 5/2021 | Prakash ............... G11B 27/036 |

\* cited by examiner

PERSONALIZED CENSORSHIP OF DIGITAL CONTENT

BACKGROUND

Field of the Various Embodiments

The various embodiments relate generally to digital content and, more specifically, to personalized censorship of digital content.

Description of the Related Art

As digital content (e.g., movies, games, music, podcasts, news, sports, audio, video, ringtones, advertisements, broadcasts, or the like) has become more prevalent, the need for censorship has increased. Censorship allows users to avoid viewing or experiencing offensive or unsuitable content, including certain categories of digital content, certain material or subject matter contained in digital content, or the like.

Users typically rely on traditional categories of digital content to determine whether or not to censor digital content. In some instances, categories are based on broad classifications of users based on characteristics such as age (e.g., PG-13, TV-14, or the like), geography, demographic information, or the like. In other instances, the categories are based on one or more characteristics of the digital content. For instance, digital content containing certain thematic elements that may require parental guidance include sub-ratings, such as DLSV categories (e.g., sexual or suggestive dialogue, coarse or crude language, sexual content, and violence), or the like. In some cases, digital content categories are based on broadcast network standards (e.g., FCC's standards related to obscene, indecent, or profane content), or the like. In other cases, users may wish to eliminate non-program content that interrupts the display of digital content (e.g., commercial advertisements, pop-ups, or the like).

These traditional categories typically result in over-censorship or under-censorship. For instance, classifications based on DLSV categories are typically too broad since those categories rely on title-level metadata, and do not consider or identify portions of a digital content item that contain the offensive or unsuitable content. This lack of granularity in the categorization typically results in censoring of broad categories of digital content that may otherwise be acceptable to certain users. In another instance, certain categories may be outdated (e.g., breastmilk and menstruation being categorized as "obscene," or the like), or may not translate across different demographics or different geographical regions. Categories based on trends or likelihood of censorship based on user characteristics (e.g., user demographic information) may be too imprecise, and may offer users little control over what content is censored. Further, such categories may be limited to groups of users who fit specific demographic profiles (e.g., censorship for kids, or the like).

Further, traditional categories do not typically account for unique censorship needs of the individual users, such as personal values, experiences, beliefs, preferences, or the like. For instance, certain users may be interested in watching violent or scary movies, but may want to avoid portions of the movie containing certain types of violence, scary elements, or the like. However, while users may be able to create user profiles that reflect broad content preferences, users typically have no way to self-select specific censorship preferences that do not fit into the traditional categories.

Furthermore, users typically have no way of indicating how important certain censorship preferences are. For instance, users may want to avoid viewing digital content containing certain material (e.g., sexual content, violence, or the like), but may be willing to view digital content containing other material (e.g., crude language, suggestive dialogue, or the like) if the relevant portions of a digital content item containing the offending or unsuitable material are muted, blacked out, or the like.

Users can typically view digital content using a wide variety of software applications, services, or the like available on personal entertainment devices or the like. Software applications that include censorship features rely on a variety of techniques to censor content. Some software applications rely on manual censorship techniques of certain portions of a digital content item (e.g., notifying the user when to leave the room, when to mute the content, when to change channels, or the like). These techniques are inefficient, error-prone, cumbersome, and typically result in an unsatisfactory viewing experience, especially when the portions to be censored appear rapidly or randomly within the digital content item, and when the duration of the portion to be censored cannot be predetermined in advance of the manual censorship.

Other software applications use automated censorship techniques (e.g., by detecting advertisements based on the short period of silence and the black picture preceding such content, predicting the length of advertisements based on certain assumptions, or the like). Such techniques tend to be complex and unreliable, and likely to result in over-censorship or under-censorship (e.g., when incorrect predictions on the length of the offending or unsuitable content result in exclusion of portions of the digital content item that do not include the offensive or unsuitable content, or the like). In many cases, such techniques are also limited in coverage, and may apply predefined censorship features (e.g., blacking out the screen for a predefined length of time, muting the audio during the predicted length of the offending or unsuitable content, or the like) without taking into account a user's preference. Further, such techniques typically allow for censorship of a limited type of content (e.g., advertisements, or the like).

Accordingly, there is a need for improved censorship techniques that efficiently and dynamically customize censorship features used during the playback of portions of a digital content item.

SUMMARY

The various embodiments set forth a computer-implemented method for personalizing censorship of digital content. The method includes generating, based on a user characteristic, a censorship profile associated with a user, wherein the censorship profile identifies a censorship element; determining a censorship feature associated with the censorship element, wherein the censorship feature is to be activated during playback of digital content that includes the censorship element; identifying, based on temporal boundaries data and temporal facet data associated with a digital content item, one or more portions of the digital content item that include at least one element matching the censorship element; and activating the censorship feature during playback of the one or more portions of the digital content item.

At least one technical advantage of the disclosed techniques relative to the prior art is that the disclosed techniques enable improved censorship of digital content by generating and maintaining customized censorship profiles for users that match their individual needs, preferences, judgement, or the like. Disclosed techniques provide users with an efficient and effective means for fine-tuning their censorship preferences to their unique viewership needs. Disclosed techniques enable granular control over censorship of one or more portions of a digital content item containing offensive or unsuitable material identified in a user's censorship profile. Disclosed techniques create an individualized and optimized viewing experience for users by dynamically activating user-specific censorship features during playback of a digital content item containing offensive or unsuitable material identified in a user's censorship profile. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4A is an example user interface for personalizing censorship of digital content, according to various embodiments of the present disclosure.

FIG. 4B is an example user interface for personalizing censorship of digital content, according to various embodiments of the present disclosure.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
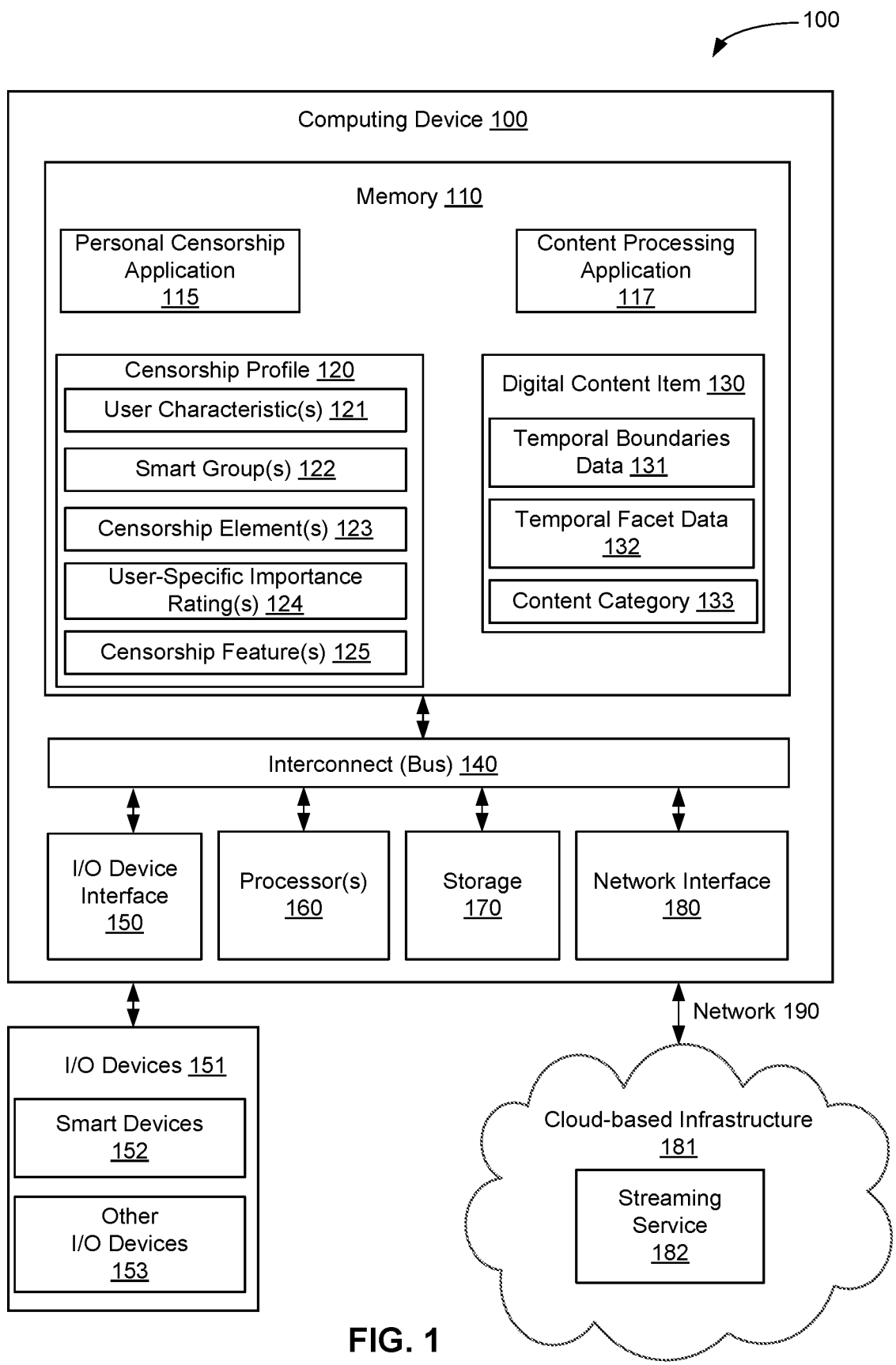
FIG. 1 is a schematic diagram illustrating a computing system configured to implement one or more aspects of the present disclosure.

FIG. 1 illustrates a computing device 100 configured to implement one or more aspects of the present disclosure. As shown, computing device 100 includes interconnect (bus) 140 that connects an input/output (I/O) device interface 150 coupled to one or more input/output (I/O) devices 151, one or more processor(s) 160, a storage 170, a network interface 180 coupled to a network 190, and a memory 110.

Computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure.

I/O device interface 150 enables communication of I/O devices 151 with processor(s) 160. I/O device interface 150 generally includes the requisite logic for interpreting addresses corresponding to I/O devices 151 that are generated by processor(s) 160. I/O device interface 150 may also be configured to implement handshaking between processor(s) 160 and I/O devices 151, and/or generate interrupts associated with I/O devices 151. I/O device interface 150 may be implemented as any technically feasible CPU, ASIC, FPGA, or any other type of processing unit or device.

I/O devices 151 include devices capable of providing input, such as a keyboard, a mouse, a touch-sensitive screen, a microphone, a remote control, and so forth, as well as devices capable of providing output, such as a display device. Additionally, I/O devices 151 may include devices capable of both receiving input and providing output, such as a touchscreen, a universal serial bus (USB) port, and so forth. I/O devices 151 may be configured to receive various types of input from an end-user of computing device 100, and to also provide various types of output to the end-user of computing device 100, such as displayed digital images or digital videos or text. In some embodiments, one or more of I/O devices 151 are configured to couple computing device 100 to a network 190.

Smart devices 152 can include, without limitation, a computing device that may be a personal computer, personal digital assistant, tablet computer, mobile phone, smart phone, media player, mobile device, or any other device suitable for implementing one or more aspects of the present invention. Smart devices 152 can augment the functionality of computing device 100 by providing various services, including, without limitation, telephone services, navigation services, infotainment services, or the like. Further, smart devices 152 can acquire data from sensors and transmit the data to computing device 100. Smart devices 152 can acquire sound data via an audio input device and transmits the sound data to computing device 100 for processing. Likewise, smart devices 152 can receive sound data from computing device 100 and transmit the sound data to an audio output device so that the user can hear audio originating from computing device 100. In some embodiments, smart devices 152 include sensors configured to acquire biometric data from the user (e.g., heartrate, skin conductance, or the like) and transmit signals associated with the biometric data to computing device 100. The biometric data acquired by the sensors can then be processed by a software application running on computing device 100. In various embodiments, smart devices 152 include any type of image sensor, electrical sensor, biometric sensor, or the like, that is capable of acquiring biometric data including, for example and without limitation, a camera, an electrode, a microphone, or the like.

Other I/O devices 153 include, without limitation, input devices, output devices, and devices capable of both receiving input data and generating output data. Other I/O devices 153 can include, without limitation, wired or wireless communication devices that send data to or receive data from smart devices 152, headphone, smart speakers, sensors, remote databases, other computing devices, or the like.

Additionally, in some embodiments, other I/O devices 153 may include a push-to-talk (PTT) button, such as a PTT button included in a vehicle, on a mobile device, on a smart speaker, or the like.

Processor(s) 160 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, processor(s) 160 may be any technically feasible hardware unit capable of processing data or executing software applications. Further, in the context of this disclosure, the computing elements shown in computing device 100 may correspond to a physical computing system (e.g., a system in a data center) or may be a virtual computing instance executing within a computing cloud.

Storage 170 includes non-volatile storage for applications and data, and may include fixed or removable disk drives, flash memory devices, and CD-ROM, DVD-ROM, Blu-Ray, HD-DVD, or other magnetic, optical, or solid state storage devices. In some embodiments, Storage 170 can include a non-transitory computer-readable medium, such as a non-volatile storage device.

Network interface 180 is a computer hardware component that connects processor 160 to a communication network. Network interface 180 may be implemented in computing device 100 as a stand-alone card, processor, or other hardware device. In some embodiments, network interface 180 may be configured with cellular communication capability, satellite telephone communication capability, a wireless WAN communication capability, or other types of communication capabilities that allow for communication with a communication network and other computing devices external to computing device 100.

Cloud-based infrastructure 181 can be any technically feasible Internet-based computing system, such as a distributed computing system or a cloud-based storage system. In some embodiments, cloud-based infrastructure 181 includes, without limitation, a plurality of networks, a plurality of servers, a plurality of operating systems, a plurality of storage devices, or the like. The server may be a stand-alone server, a cluster or "farm" of servers, one or more network appliances, or any other device suitable for implementing one or more aspects of the present disclosure.

Streaming service 182 provides digital content available in a cloud-based infrastructure 181. Streaming service 182 provides a variety of digital content (e.g., movies, games, music, podcasts, news, sports, audio, video, ringtones, advertisements, broadcasts, or the like). In some embodiments, streaming service 182 provides access to digital content stored in a digital content repository. In some embodiments, the digital content is also stored locally on computing device 100. In some embodiments, streaming service 182 includes a web-based program for selecting digital content. In some embodiments, a digital content item 130 available via streaming service 182 can be selected automatically based on data acquired from one or more sensors located on one or more smart devices 152. For instance, digital content on streaming service 182 can be selected based on a sensor on smart device 152 capturing the user voice selection, motion, gesture, or the like associated with the selection of a digital content item 130, or the like.

Network 190 includes any technically feasible type of communications network that allows data to be exchanged between computing device 100 and external entities or devices, such as a web server or another networked computing device. For example, network 190 may include a wide area network (WAN), a local area network (LAN), a wireless (WiFi) network, or the Internet, among others.

Memory 110 includes a random access memory (RAM) module, a flash memory unit, or any other type of memory unit or combination thereof. Processor(s) 160, I/O device interface 150, and network interface 180 are configured to read data from and write data to memory 110. Memory 110 includes various software programs that can be executed by processor(s) 160, including personal censorship application 115, content processing application 117, and application data associated with said software programs, including censorship profile 120 and digital content item 130.

Personal censorship application 115 generates and displays a user interface (not shown) for personalizing censorship of digital content. Personal censorship application 115 allows a user to create or modify censorship profile 120. In some embodiments, personal censorship application 115 includes a web-based program for creating or modifying censorship profile 120. In some embodiments, personal censorship application 115 allows a user to create or modify censorship profile 120 in a real time manner during playback of a digital content item 130. Censorship profile 120 includes user-specific information associated with a user's censorship preferences, unique viewership needs, or the like. Censorship profile 120 includes user characteristics 121, smart groups 122, censorship elements 123, user-specific importance ratings 124, censorship features 125, or the like. In some embodiments, censorship profile 120 omits one or more features such as user characteristics 121, smart groups 122, censorship elements 123, user-specific importance ratings 124, censorship features 125, or the like. In some embodiments, additional features may be added to censorship profile 120.

In operation, personal censorship application 115 generates a censorship profile 120 based on one or more user characteristics 121. User characteristics 121 include language preferences, geographical location, demographic information (e.g., user's age, sex, or the like), user biometric information, user content viewing preferences, user content viewing history, user household information, user social media history, or the like. In some instances, user characteristics 121 includes a grouping or segmentation of the user based on a combination of demographic information associated with similarly situated users, such as age, sex, or the like. In other instances, user characteristics 121 include predicted demographic information associated with the user and an associated weight, score, probability value, or the like corresponding to a confidence level associated with the prediction.

To generate censorship profile 120, personal censorship application 115 analyzes one or more user characteristics 121 such as user demographic information, geographical location, content viewing preferences, or the like. In some embodiments, personal censorship application 115 generates suggested censorship elements 123 and corresponding user-specific importance ratings 124 for each censorship element 123 to include in censorship profile 120. Personal censorship application 115 generates the suggested censorship elements 123 and corresponding user-specific importance ratings 124 based on an algorithmic analysis of user characteristics 121, censorship profile data of users with characteristics similar to user characteristics 121, traditional categories applicable to users with characteristics similar to user characteristics 121, real time or dynamically generated data on trends or predictions of censorship selections for users with characteristics similar to user characteristics 121, or the like. In some embodiments, personal censorship application 115 provides the user with an option to interactively view the association between user characteristics 121 and suggested censorship elements 123 in censorship profile 120, and to modify the user characteristics 121 used as a basis for creating censorship profile 120. In some instances, the association includes an indication of the degree of importance or relevance of a user characteristic 121 (e.g., age) in the determination of a suggested censorship element 123 (e.g., data associated with PG-13 rating, flagging of certain activities or thematic elements, or the like). In some embodiments, the associations are obtained using statistical analysis, data mining, clustering techniques, or the like.

Censorship element 123 can include any data associated with an evaluation, rating, classification, flagging, tagging, restriction, exemption, prohibition or the like of content based on one or more criteria such as suitability for particular audiences, sensitivity, objectionability, user preferences, or the like. In some embodiments, censorship element 123 includes data associated with harmful content, unsuitable content, offensive content, or the like. In some embodiments, censorship element 123 includes data associated with dialogue, talent, locations, activities, events, story archetypes, character traits, character motivations, news topics, moods, thematic elements, or the like. In some instances, censorship element 123 can be pre-selected or automatically suggested based on one or more criteria such as user characteristics 121, geographic information, legal agreement, or the like. In some instances, censorship element 123 can include data associated traditional categories based on age (e.g., PG-13, TV-14, or the like), DLSV categories (e.g., sexual or suggestive dialogue, coarse or crude language, sexual content, and violence), broadcast network standards (e.g., FCC's standards related to obscene, indecent, or profane content), or the like.

Personal censorship application 115 recommends, based on user characteristics 121, one or more smart groups 122 to the user. Smart groups 122 include a group to which users can be added or removed based on a set of rules or criteria. In one embodiment, personal censorship application 115 generates the rules or criteria for creating smart groups 122 based on an algorithmic analysis of users with characteristics similar to user characteristics 121, censorship profile data on users with characteristics similar to user characteristics 121, traditional categories applicable to users with characteristics similar to user characteristics 121, real time or dynamically generated data on trends or predictions of censorship selections for users with characteristics similar to user characteristics 121, or the like.

In some instances, personal censorship application 115 generates the rules or criteria for creating smart groups 122 based on feedback from aggregate training data obtained from users with characteristics similar to user characteristics 121 or the like. The feedback can include real time or dynamically generated data on trends or predictions of censorship selections, new or popular censorship groups, or the like. In some embodiments, personal censorship application 115 generates smart groups 122 based on traditional categories applicable to users with characteristics similar to user characteristics 121. Traditional categories include categories based on age (e.g., PG-13, TV-14, or the like), DLSV categories (e.g., sexual or suggestive dialogue, coarse or crude language, sexual content, and violence), broadcast network standards (e.g., FCC's standards related to obscene, indecent, or profane content), or the like. In some embodiments, personal censorship application 115 generates smart group 122 based on data obtained by active learning algorithms or the like. In some embodiments, the active learning algorithms generate smart groups 122 based on data obtained from one or more sensors included in one or more smart devices 152 or the like. The data obtained from sensors can include biometric data, information indicative of whether other viewers are present in the room, user voice selection, motion, gesture, or the like.

Personal censorship application 115 can provide smart group 122 recommendations before, during, or after a user selects censorship elements 123 to include in censorship profile 120. In some embodiments, personal censorship application 115 generates suggested smart groups 122 based on actual data obtained from users with similar user characteristics 121 or the like. In some instances, personal censorship application 115 provides the user with an opt-in option to receive automated recommendations on new or updated smart groups 122 based on training data obtained from users with similar user characteristics 121.

Personal censorship application 115 updates censorship profile 120 based on censorship elements included in selected smart group 122. In one instance, personal censorship application 115 compares the censorship elements 123 in censorship profile 120 to censorship elements included in the selected smart group 122. Personal censorship application 115 then adds, removes, or changes censorship elements 123 included in censorship profile 120 based on the censorship elements included in the selected smart group 122. In another instance, personal censorship application 115 changes the information associated with one or more censorship elements 123 in censorship profile 120 based on the corresponding censorship element included in the selected smart group 122.

In some embodiments, personal censorship application 115 modifies, based on user input, a censorship element 123 included in censorship profile 120. In some embodiments, personal censorship application 115 adds, removes, or changes a censorship element 123 included in censorship profile 120 based on user input. In some embodiments, personal censorship application 115 adds, removes, or changes a censorship element 123 included in censorship profile 120 based on a sensor on a smart device 152 capturing the user voice selection, motion, gesture, or the like associated with the addition, removal, change, or the like.

In some embodiments, personal censorship application 115 associates the one or more censorship elements 123 in censorship profile 120 with one or more content categories 133. Content category 133 includes any classification of digital content such as movies, games, music, podcasts, news, sports, audio, video, ringtones, advertisements, broadcasts, or the like. In some instances, content category 133 includes classification of the digital content based on genre, title-level metadata, frame-level metadata, scene-level metadata, or the like. In some embodiments, personal censorship application 115 adds, removes, or changes a censorship element 123 associated with one or more content categories 133 based on user input. In some embodiments, personal censorship application 115 adds, removes, or changes a censorship element 123 associated with one or more content categories 133 based on a sensor on a smart device 152 capturing the user voice selection, motion, gesture, or the like associated with the addition, removal, change, or the like.

Personal censorship application 115 modifies, based on user input, a user-specific importance rating 124 for each censorship element 123. User-specific importance rating 124 includes an indication of the degree of importance of censorship element 123. In some embodiments, user-specific importance rating 124 of one censorship element 123 is determined based on a correlation with user characteristic 121, traditional categories, content category 133, or the like. In some embodiments, the correlation is obtained using statistical analysis, data mining, clustering techniques, or the like. User-specific importance rating 124 can include a scale of how much a user would like to censor censorship element 123. In some embodiments, user-specific importance rating 124 is a range of values or the like. In some embodiments, user-specific importance rating 124 includes a predicted rating associated with censorship element 123 and an associated weight, score, probability value, or the like corresponding to a confidence level associated with the prediction.

In some embodiments, personal censorship application 115 allows a user to modify user-specific importance rating 124 using a sliding scale, dial, text box or the like. In some embodiments, personal censorship application 115 allows a user to modify user-specific importance rating 124 using a toggle feature that allows a user to toggle between two values representative of the importance of the associated censorship element 123 (e.g., Yes/No, include/exclude, or the like).

Personal censorship application 115 determines, based on the user-specific importance rating 124, a censorship feature 125 to activate during playback of a portion of digital content containing one or more censorship elements 123. Censorship feature 125 includes any feature of a software, application, platform, or the like that allows control over playback of a digital content item 130. Censorship feature 125 includes alerts, flags, auto-pause, auto-skip, auto-black out, auto-muting audio, or the like. In some embodiments, censorship feature 125 may include a combination of one or more features such as auto-blacking out a portion of a scene while muting the other occurrences of a censorship element 123, providing a storyline summary for auto-skipped or auto-blacked out scenes, or the like.

In some embodiments, personal censorship application 115 provides the user with functionality to customize how each censorship feature 125 should be implemented. For instance, a user can indicate whether the censorship feature 125 should be activated before, during, or within a predefined timeframe of the censorship element 123 being displayed. In another instance, a user can indicate variations in how a censorship feature 125 is activated (e.g., muting a whole dialogue versus muting only occurrences of the censorship element 123, or the like). In other instances, a user can indicate exceptions to the activation of the censorship feature 125. The exceptions can include content category exceptions (e.g., whether to activate certain censorship features 125 for certain classes of digital content such as sports, games, or the like), time of day exceptions (e.g., whether to whether to activate certain censorship features 125 during certain timeframes, or the like), playback mode exceptions (e.g., whether to apply during fast-forward or rewinding of the content viewing application, or the like), or the like.

In some embodiments, personal censorship application 115 dynamically determines which censorship feature 125 to activate for a given censorship element 123 based on one or more criteria. The criteria include, but are not limited to, user-specific importance rating 124, user characteristics 121, traditional categories, content category 133, or the like. In some embodiments, personal censorship application 115 determines which censorship feature 125 to activate for a given censorship element 123 based on user input. In some embodiments, the user can indicate a hierarchical list of preferred censorship features 125 to activate for a given censorship element 123. For instance, for a given censorship element 123, a user can select a list of censorship features 125 (e.g., alert, flag, auto-pause, auto-skip, auto-black out, or auto-muting audio), in a descending order of preference (e.g., from most preferred to least preferred), ascending order of preference, or the like.

In some embodiments, personal censorship application 115 determines which censorship feature 125 to activate for a given censorship element 123 based on availability of the censorship feature 125 in one or more applications used to access the digital content item 130. In some embodiments, personal censorship application 115 compares the available censorship features 125 against a hierarchical list of user-specific preferences to determine which of the available censorship features 125 to activate for a given censorship element 123. For instance, for a given censorship element 123, personal censorship application 115 compares the available censorship features 125 (e.g., auto-black out, auto-pause, auto-skip) against a hierarchical list of user-specific preferred censorship features 125 (e.g., a descending order of preference that includes: alert, flag, auto-skip, auto-pause, auto-black out, or auto-muting audio) to determine which censorship feature to activate (e.g., auto-skip).

In some embodiments, personal censorship application 115 can autosuggest censorship feature 125 to activate for a given censorship element 123 based on an algorithmic analysis of censorship feature 125 activations for censorship element 123 by users with similar user characteristics 121, real time or dynamically generated data on trends or predictions of censorship feature 125 activations for users with user characteristics 121, or the like.

Personal censorship application 115 saves censorship profile 120. In some embodiments, personal censorship application 115 stores censorship profile 120 in a networked storage device, such as a device connected to cloud-based infrastructure 181. In some embodiments, censorship profile 120 is stored locally on computing device 100, such as in storage 170 or the like. In some embodiments, personal censorship application 115 saves censorship profile 120 based on a sensor on a smart device 152 capturing the user voice selection, motion, gesture, or the like associated with saving of the profile or the like.

Content processing application 117 applies censorship profile 120 generated by personal censorship application 115 to playback of the digital content items 130. In operation, content processing application 117 loads temporal boundaries data 131 and temporal facet data 132 for a selected digital content item 130 and, based on that data, selectively activates censorship features 125 corresponding to censorship elements 123 to the digital content item 130. Details regarding the operation of content processing application 117 are provided below.

Content processing application 117 receives a user selection of a digital content item 130 for playback. The user can select, from the whole digital content item 130, a portion of the digital content item 130, an aggregate of one or more portions of digital content items 130, or the like. In some embodiments, the user selects the digital content item 130 from streaming service 182, from a playlist, from a web-based program, a program stored locally on computing device 100, or the like. In some embodiments, the user selection is automatically determined based on data acquired from one or more sensors located on one or more smart devices 152, or the like.

In some embodiments, content processing application 117 automatically generates a list of digital content items 130 available for viewing based on censorship profile 120. For instance, content processing application 117 can determine a rating for one or more digital content items 130 in a plurality of digital content items 130 in a specific genre or category of digital content, the rating for each digital content item 130 being based on the frequency of occurrence of elements matching censorship elements 123 in the digital content item 130. Content processing application 117 can then generate a hierarchical listing of the digital content items 130 based on the relative rating of each item.

Content processing application 117 loads temporal boundaries data 131 and temporal facet data 132 for the selected digital content item 130. For a given digital content item 130, the corresponding temporal boundaries data 131 includes any grouping or segmentation of one or more frames in the digital content item 130 such as scenes, acts, sub-scenes, moments, or the like. In some instances, temporal boundaries data 131 includes the point-in-time or timecode (e.g., frame) location of each boundary, the duration of each grouping of frames (e.g., scenes), any gaps between the groupings, or the like.

For a given digital content item 130, temporal facet data 132 includes any data associated with one or more frames in the digital content item 130. In some instances, temporal facet data 132 includes metadata, annotations, transcripts, or the like associated with the content appearing in a point-in-time or timecode (e.g., frame) in the digital content item 130. In some embodiments, temporal facet data 132 includes data reflecting where annotations or the like exist within the timeline of the digital content item 130. In some embodiments, temporal facet data 132 includes words, closed captions, concepts, dialogues, or the like associated with a point-in-time in the digital content item 130.

In some embodiments, content processing application 117 automatically generates temporal boundaries data 131 based on a dynamic analysis of the frames, pixel data, color changes between frames, resolution, or the like. In some embodiments, content processing application 117 obtains temporal boundaries data 131 from pre-generated scene boundaries data, automatically generated scene cuts, or the like obtained using scene detection techniques or the like. In some embodiments, automatically generated scene cuts are obtained in real time during streaming of the digital content item. In some embodiments, the temporal facet data 132 is manually generated, for instance, through manual tagging by anyone involved in the content generation process prior to the digital content being presented to the user such as the studio, the distributor, the streaming service, or the like. In some embodiments, content processing application 117 dynamically generates temporal facet data 132 using voice recognition software, image recognition software, or the like. In some embodiments, content processing application 117 obtains temporal facet data 132 from pre-generated data obtained using voice recognition software, image recognition software, or the like.

In some embodiments, content processing application 117 loads temporal boundaries data 131 or temporal facet data 132 for the selected digital content item 130 from a networked storage device, such as a device connected to cloud-based infrastructure 181. In some embodiments, content processing application 117 loads temporal boundaries data 131 or temporal facet data 132 from local storage on computing device 100, such as storage 170 or the like.

Content processing application 117 determines whether censorship profile 120 is available for the user. In some embodiments, content processing application 117 queries a networked storage device, such as a device connected to cloud-based infrastructure 181, or the like. In some embodiments, content processing application 117 queries a local storage on computing device 100, such as storage 170 or the like.

In some embodiments, content processing application 117 enables a user to select which of multiple censorship profiles 120 to apply, such as where a user has multiple profiles, where a user would like to aggregate one or more censorship profiles during viewing, or the like. In some embodiments, content processing application 117 can allow a user to determine when to apply a given censorship profile 120, such as by allowing a user to toggle censorship on or off as needed.

Content processing application 117 provides the user an option for creating censorship profile 120. In some embodiments, content processing application 117 provides a user interface that allows the user to create or modify censorship profile 120 during playback of a digital content item 130, such as a user interface associated with personal censorship application 115, or the like.

In some embodiments, content processing application 117 can interactively query a user for input during the viewing experience in order to further update censorship profile 120. For instance, if a user fast-forwards through a portion of a digital content item 130, content processing application 117 can query the user (e.g., using a pop-up with a user prompt or the like) to determine whether the portion of the digital content item 130 contains an additional censorship element 123, whether to match an element contained in the portion of the digital content item 130 to a censorship element 123 already included in censorship profile 120, or the like. Content processing application 117 can then update censorship profile 120 based on the user's input. In some embodiments, content processing application 117 updates censorship profile 120 in a real time manner during playback of the one or more portions of the digital content item 130.

In some embodiments, content processing application 117 can obtain sensor information (e.g., information indicative of whether other viewers are present in the room), and prompt the user regarding whether to apply additional or alternative censorship profiles 120 during viewing of the digital content item 130. In some embodiments, content processing application 117 can automatically determine what profile to apply based on predefined user preferences. For instance, content processing application 117 can determine, based on sensor information (e.g., photoelectric, proximity, or motion sensor information indicative of presence of a child, voice or image recognition information associated with a child, activity in an IoT (internet of things) connected device or toy indicative of presence of a child, or the like), whether a child is in the room. Content processing application 117 can then automatically match elements in the digital content item 130 associated with censorship elements 123 in a predefined censorship profile for children, a smart group for children, or the like. Content processing application 117 can then continue playback of the digital content item 130 according to a combination of censorship profile 120 and the smart group preferences.

Content processing application 117 identifies one or more portions of the digital content item 130 containing an element matching one or more censorship elements 123 in censorship profile 120. Content processing application 117 can combine temporal boundaries data 131 and temporal facet data 132 to indicate, on a user interface (not shown), a breakdown of the point-in-time occurrence of various censorship elements 123 in the timeline of the digital content item 130. In some embodiments, the breakdown includes one or more flags indicating where each censorship element 123 occurs within the timeline of the digital content item 130, the percentage of the duration of the censorship element 123 relative to the duration of the digital content item 130, the number of total discrete occurrences within the digital content item 130, or the like. In some embodiments, a visualization of the breakdown is dynamically generated and displayed on the user interface. In some embodiments, the visualization of the breakdown includes graphs, charts, statistical analysis data, categories of the elements, or the like.

In some embodiments, content processing application 117 provides a breakdown of censorship elements in the digital content item 130 that match censorship elements 123 associated with censorship profile 120. For instance, content processing application 117 can provide a breakdown of only the elements (e.g., kissing, violence, curse words, or the like) occurring in the digital content item 130 that match censorship elements 123 in censorship profile 120. In some embodiments, content processing application 117 assigns a weight, score, probability value, or the like corresponding to a confidence level in the match between an element included in the temporal facet data 132 and the censorship element 123.

In some embodiments, content processing application 117 dynamically generates a preview of the one or more portions of the digital content item 130 containing elements matching censorship elements 123 in censorship profile 120. In some embodiments, the preview indicates the timeline of the digital content item 130 along with an indicator (e.g., flag, alert, or the like) of the one or more portions of the digital content item 130 containing elements matching censorship elements 123. In some embodiments, the preview also includes a visualization of the element itself along with a related visualization of the statistical properties (e.g., frequency, percentage of canon duration, or the like) associated with the occurrence of the element in the digital content item 130.

In some embodiments, content processing application 117 dynamically generates a dashboard that provides a visualization of the censorship elements 123 in censorship profile 120, and the corresponding visual representation of the digital content item 130 along with one or more indications of the elements contained in the digital content item 130 that match the censorship elements 123.

In some embodiments, content processing application 117 provides a rating of the digital content item 130 based on a statistical analysis of the temporal boundaries data 131 and temporal facet data 132 compared against each censorship elements 123 in censorship profile 120. For instance, where censorship profile 120 includes a certain number of censorship elements 123, content processing application 117 can perform a statistical analysis of the temporal boundaries data 131 and temporal facet data 132 to determine one or more statistical attributes associated with the occurrence of each censorship element 123 in the digital content item 130. Examples of such statistical attributes include frequency of occurrence of a censorship element 123 in each scene, the number of scenes including a censorship element 123, the canon duration of the censorship element 123 in each scene and across multiple scenes, or the like. In some instances, content processing application 117 determines the rating of the digital content item 130 based on a cumulative weight, cumulative score, cumulative probability value, or the like corresponding to a cumulative confidence level in the match between each element included in the temporal facet data and each censorship element 123.

Content processing application 117 activates a censorship feature 125 corresponding to each censorship element 123 during playback of the one or more portions of the digital content item 130. In some embodiments, content processing application 117 allows a user to determine what action to take in response to the information identifying one or more portions of the digital content item 130 containing an element matching each censorship element 123 in censorship profile 120. For instance, content processing application 117 can allow a user to skip the digital content item 130 entirely, watch the digital content item 130 entirely, or activate all or some of the censorship features 125 associated with each censorship element 123 to the one or more portions of the digital content item 130 containing the censorship element 123. In another instance, content processing application 117 can include functionality to allow a user to interactively make selections of what censorship features 125 to activate during playback of the one or more portions of the digital content item 130.

In some embodiments, content processing application 117 can integrate with one or more smart devices 152 to interactively obtain sensor information such as user voice input (e.g., voice information associated with a scream), motion (e.g., user motion associated with covering of the eyes), gesture, biometric information (e.g., increase in heartrate), or the like. Content processing application 117 can obtain the sensor information during playback of the digital content item 130, and determine whether to query the user to determine whether the corresponding portions of the digital content item 130 contain one or more additional censorship elements 123, whether to match an element contained in the corresponding portion of the digital content item 130 to a censorship element 123 already included in censorship profile 120, or the like. Content processing application 117 can the update censorship profile 120 based on the user's input.

Figure 2:
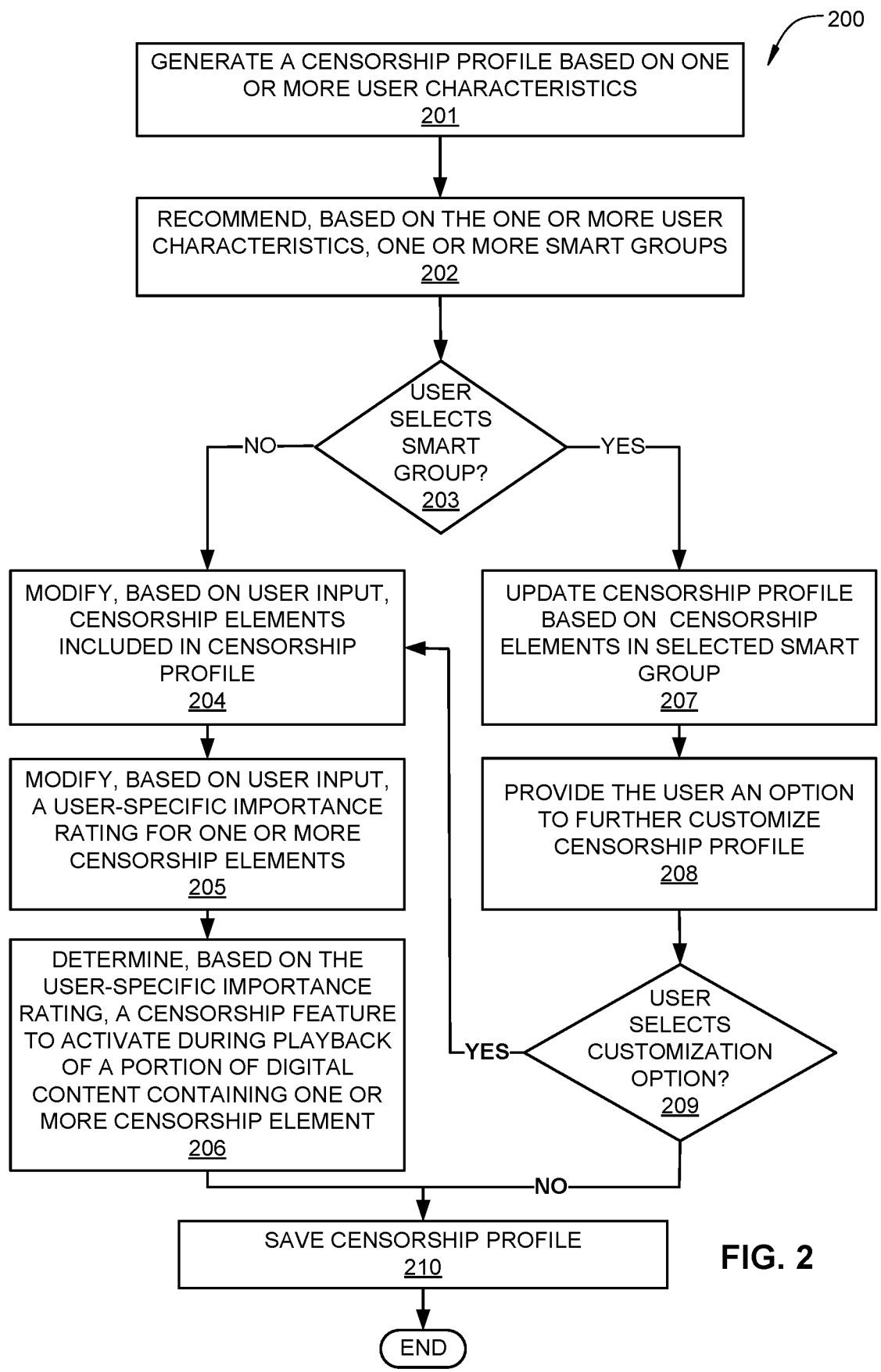
FIG. 2 is a flowchart of method steps for personalizing censorship of digital content, according to various embodiments of the present disclosure.

FIG. 2 is a flowchart of method steps 200 for personalizing censorship of digital content performed by computing system of FIG. 1, according to various embodiments of the present disclosure. Although the method steps are described in conjunction with the system of FIG. 1, persons skilled in the art will understand that any system configured to perform the method steps in any order falls within the scope of the present disclosure.

In step 201, personal censorship application 115 generates a censorship profile 120 based on one or more user characteristics 121. In some embodiments, personal censorship application 115 analyzes one or more user characteristics 121 such as user demographic information, geographical location, content viewing preferences, or the like. In some embodiments, personal censorship application 115 generates one or more suggested censorship elements 123 and corresponding user-specific importance ratings 124 based on an algorithmic analysis of user characteristics 121, real time or dynamically generated data on trends or predictions of censorship selections for users with user characteristics 121, or the like.

In some embodiments, personal censorship application 115 provides the user with an option to interactively view the association between one or more user characteristics 121 and one or more suggested censorship elements 123 in censorship profile 120, and to modify the user characteristics 121 used as a basis for creating censorship profile 120, modify the association between the user characteristics 121 and the one or more suggested censorship elements 123, or the like. In some embodiments, personal censorship application 115 provides the user with an option to interactively view the association between one or more user characteristics 121 and the associated user-specific importance rating 124 of one or more suggested censorship elements 123 in censorship profile 120, and to modify the user characteristics 121 used as a basis for creating censorship profile 120, modify the association between the user characteristics 121 and the one or more suggested censorship elements 123, modify the associated user-specific importance rating 124, or the like. In some embodiments, personal censorship application 115 provides the user with an option to interactively view the association between user characteristics 121 and the importance rating 124 of the corresponding suggested censorship elements 123 in censorship profile 120, and to modify the user characteristics 121 used as a basis for creating censorship profile 120.

In step 202, personal censorship application 115 recommends, based on the one or more user characteristics 121, one or more smart groups 122. In some instances, personal censorship application 115 recommends smart groups 122 based on feedback from aggregate training data obtained from users with similar user characteristics 121 or the like. The feedback can include real time or dynamically generated data on trends or predictions censorship selections, new or popular censorship groups, or the like. In some embodiments, personal censorship application 115 recommends smart groups 122 based on traditional categories applicable to users with similar user characteristics 121. In some embodiments, personal censorship application 115 recommends smart group 122 based on data obtained by active learning algorithms or the like. In some embodiments, the active learning algorithms generate recommendations based on data obtained from one or more sensors included in one or more smart devices 152, including biometric data, information indicative of whether other viewers are present in the room, user voice selection, motion, gesture, or the like.

Personal censorship application 115 can provide smart group 122 recommendations before, during, or after a user selects censorship elements 123 to include in censorship profile 120. In some embodiments, personal censorship application 115 generates suggested smart groups 122 based on actual data obtained from users with similar user characteristics 121 or the like. In some instances, personal censorship application 115 provides the user with an opt-in option to receive automated recommendations on new or updated smart groups 122 based on training data obtained from users with similar user characteristics 121.

In step 203, personal censorship application 115 determines whether the user selected a smart group 122. In some embodiments, personal censorship application 115 determines user selection based on user input via one or more I/O devices 151. In some embodiments, personal censorship application 115 determines user selection based on a sensor on smart device 152 capturing the user voice selection, motion, gesture, or the like associated with the selection of a smart group 122. When the user does not select a smart group 122, personal censorship application 115 modifies censorship profile 120 based on user input in any of steps 204-206. In some embodiments, when the user does not select a smart group 122, personal censorship application 115 automatically selects default settings for censorship profile 120 (e.g., based on aggregate training data obtained from users with similar user characteristics 121 or the like; real time or dynamically generated data on trends or predictions of censorship profiles for users with user characteristics 121, or the like) and saves censorship profile 120 in step 210. When the user selects a smart group 122, personal censorship application 115 updates censorship profile 120 in step 207.

In step 204, personal censorship application 115 modifies, based on user input, censorship elements 123 included in censorship profile 120. In some embodiments, personal censorship application 115 associates one or more censorship elements 123 with one or more content categories 133. In some embodiments, personal censorship application 115 adds, removes, or changes a censorship element 123 included in censorship profile 120 based on user input. In some embodiments, personal censorship application 115 adds, removes, or changes a censorship element 123 included in censorship profile 120 based on a sensor on smart device 152 capturing the user voice selection, motion, gesture, or the like associated with the addition, removal, change, or the like. In some embodiments, personal censorship application 115 adds, removes, or changes the association between a censorship element 123 and a content category 133 based on a sensor on smart device 152 capturing the user voice selection, motion, gesture, or the like associated with the addition, removal, change, or the like.

In step 205, personal censorship application 115 modifies, based on user input, a user-specific importance rating 124 for one or more censorship elements 123. In some embodiments, personal censorship application 115 allows a user to modify user-specific importance rating 124 using a sliding scale, dial, text box, a toggle feature, or the like. In some embodiments, personal censorship application 115 adds, removes, or changes a user-specific importance rating 124 for one or more censorship elements 123 based on a sensor on smart device 152 capturing the user voice selection, motion, gesture, or the like associated with the addition, removal, change, or the like.

In step 206, personal censorship application 115 determines, based on the user-specific importance rating 124, a censorship feature 125 to activate during playback of a portion of digital content containing one or more censorship elements 123. In some embodiments, personal censorship application 115 provides the user with functionality to customize how each censorship feature 125 should be implemented including timing of activation, variations in how a censorship feature 125 is activated, exceptions to the activation of the censorship feature 125, or the like.

In some embodiments, personal censorship application 115 dynamically determines which censorship feature 125 to activate for a given censorship element 123 based user input, user-specific importance rating 124, user characteristics 121, traditional categories, content category 133, availability of the censorship feature 125 in one or more applications used to access the digital content item 130, or the like. In some embodiments, personal censorship application 115 reviews the available censorship features 125 against a hierarchical list of the user's preferred censorship features 125 for a given censorship element 123 to determine which of the available censorship features 125 to activate. In some embodiments, personal censorship application 115 can auto-suggest censorship feature 125 to activate for a given censorship element 123 based on an algorithmic analysis of censorship feature 125 activations for censorship element 123 by users with similar user characteristics 121, real time or dynamically generated data on trends or predictions of censorship feature 125 activations for users with user characteristics 121, or the like. After step 206, personal censorship application 115 saves censorship profile 120 in step 210.

In step 207, which is performed when the user selects a smart group 122 in step 203, personal censorship application 115 updates censorship profile 120 based on one or more censorship elements in selected smart group 122. Personal censorship application 115 adds, removes, or changes censorship elements 123 included in censorship profile 120 based on a comparison with censorship elements included in the selected smart group 122. In another instance, personal censorship application 115 changes the information associated with one or more censorship elements 123 in censorship profile 120 based on a comparison with the corresponding censorship element included in the selected smart group 122.

In step 208, personal censorship application 115 provides the user an option to further customize censorship profile 120. In some embodiments, personal censorship application 115 provides the user with an option to interactively select, for customization, the association between one or more user characteristics 121, one or more censorship elements in smart group 122, the corresponding censorship elements 123 in censorship profile 120, and the associated user-specific importance rating 124 for one or more censorship elements 123, and the censorship feature 125 to activate for a given censorship element 123. In some embodiments, the customization option includes a sliding scale, dial, text box, a toggle feature, or the like.

In step 209, personal censorship application 115 determines whether the user selected a customization option. In some embodiments, personal censorship application 115 determines user selection based on a sensor on smart device 152 capturing the user voice selection, motion, gesture, or the like associated with the selection of a smart group 122. When the user selects the customization option, personal censorship application 115 modifies censorship profile 120 based on user input in any of steps 204-206. When the user does not select the customization option, personal censorship application 115 saves censorship profile 120 in step 210.

In step 210, personal censorship application 115 saves censorship profile 120. In some embodiments, personal censorship application 115 stores censorship profile 120 in a networked storage device, such as a device connected to cloud-based infrastructure 181. In some embodiments, censorship profile 120 is stored locally on computing device 100, such as in storage 170 or the like. In some embodiments, personal censorship application 115 saves censorship profile 120 based on a sensor on smart device 152 capturing the user voice selection, motion, gesture, or the like associated with saving of the profile or the like.

Figure 3:
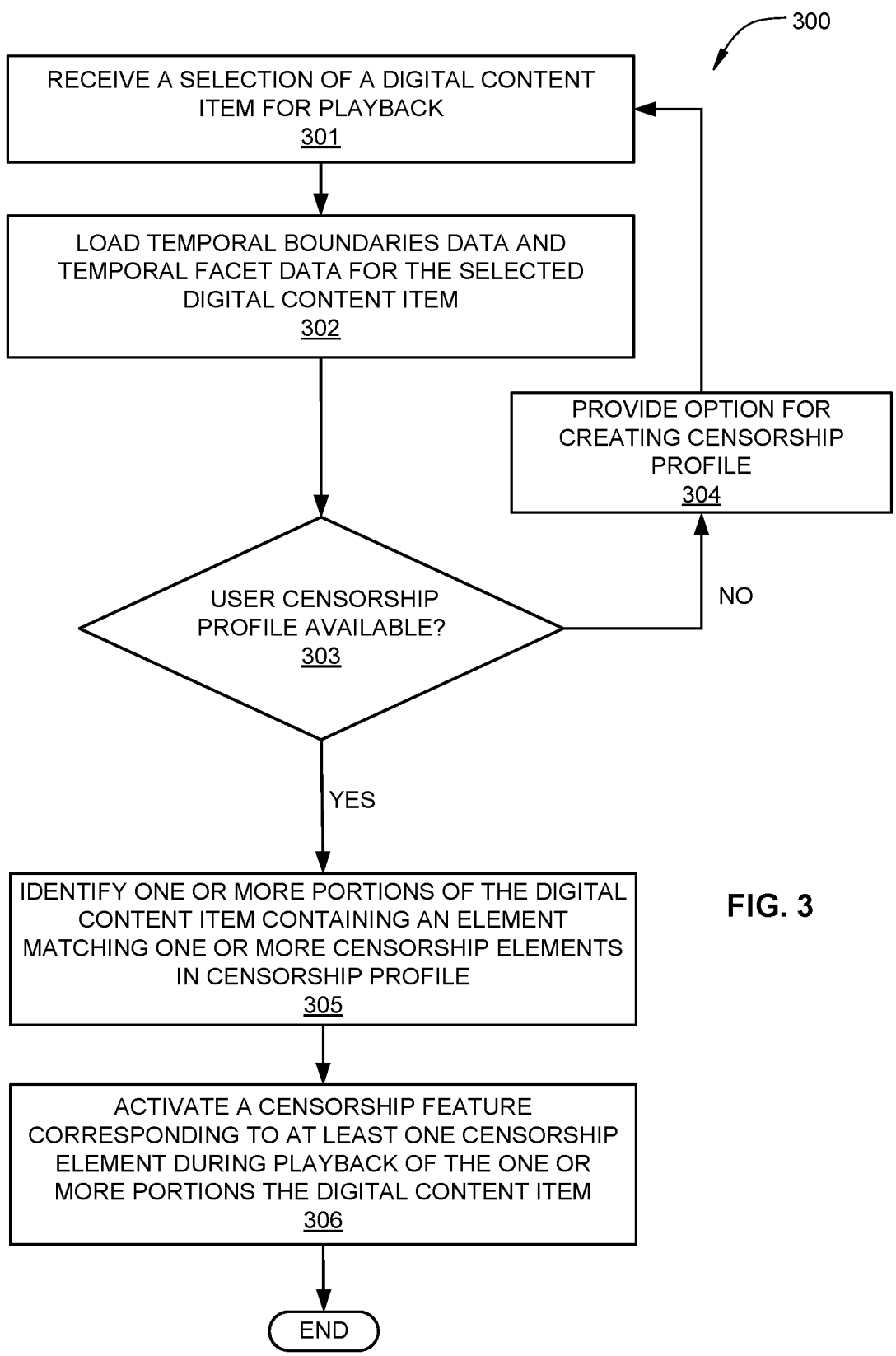
FIG. 3 is a flowchart of method steps for applying personalized censorship preferences to playback of a digital content item, according to various embodiments of the present disclosure.

FIG. 3 is a flowchart of method steps 300 for applying personalized censorship preferences to playback of a digital content item 130 performed by computing system of FIG. 1, according to various embodiments of the present disclosure. Although the method steps are described in conjunction with the system of FIG. 1, persons skilled in the art will understand that any system configured to perform the method steps in any order falls within the scope of the present disclosure.

In step 301, content processing application 117 receives a selection of a digital content item 130 for playback. In some embodiments, a user selects the digital content item 130 from streaming service 182, from a playlist, from a web-based program, a program stored locally on computing device 100, or the like. In some embodiments, content processing application 117 automatically generates a list of digital content items 130 available for viewing based on censorship profile 120. The user can select the whole digital content item 130, a portion of the digital content item 130, an aggregate of one or more portions of digital content items 130, or the like. In some embodiments, the user selection is automatically determined based on data acquired from a sensor located on smart device 152, or the like.

In step 302, content processing application 117 loads, on the user device, streaming platform server, content server, or the like, temporal boundaries data 131 and temporal facet data 132 for the selected digital content item 130. In some embodiments, content processing application 117 automatically generates temporal boundaries data 131 based on a dynamic analysis of the frames, pixel data, color changes between frames, resolution, or the like. In some embodiments, content processing application 117 obtains temporal boundaries data 131 from pre-generated scene boundaries data obtained using scene detection techniques or the like. In some embodiments, content processing application 117 dynamically generates temporal facet data 132 using voice recognition software, image recognition software, or the like. In some embodiments, content processing application 117 obtains temporal facet data 132 from pre-generated data obtained using voice recognition software, image recognition software, or the like. In some embodiments, content processing application 117 loads temporal boundaries data 131 or temporal facet data 132 for the selected digital content item 130 from networked storage device, such as a device connected to cloud-based infrastructure 181.

In step 303, content processing application 117 determines whether a censorship profile 120 is available. In some embodiments, content processing application 117 queries a networked storage device, such as a device connected to cloud-based infrastructure 181, or the like. In some embodiments, content processing application 117 queries a local storage on computing device 100, such as storage 170 or the like.

In step 304, which is performed if a censorship profile is not available, content processing application 117 provides the user an option for creating censorship profile 120. In some embodiments, content processing application 117 provides a user interface that allows the user to create or modify censorship profile 120, such as a user interface associated with personal censorship application 115, or the like. In some embodiments, content processing application 117 can interactively query a user for input during the viewing experience in order to further update censorship profile 120. In some embodiments, content processing application 117 can obtain sensor information (e.g., information indicative of whether other viewers are present in the room), and prompt the user regarding whether to apply additional or alternative censorship profiles 120 during viewing of the digital content item 130. In some embodiments, when the user does not create censorship profile 120, content processing application 117, via personal censorship application 115, automatically selects default settings for censorship profile 120 (e.g., based on aggregate training data obtained from users with similar user characteristics 121 or the like; real time or dynamically generated data on trends or predictions of censorship profiles for users with user characteristics 121, or the like) and saves censorship profile 120.

In step 305, which is performed when a censorship profile 120 is available, content processing application 117 identifies one or more portions of the digital content item 130 containing an element matching one or more censorship elements 123 in censorship profile 120. In some embodiments, when there is a plurality of censorship profiles, content processing application 117 determines which censorship profile 120 to use. In some embodiments, content processing application 117 provides the user with a menu, list, or the like outlining available censorship profiles and requesting user input. In some embodiments, content processing application 117 automatically determines which censorship profile 120 to use based on one or more factors such as user indication of a primary censorship profile, censorship profile associated with current user account or user session, most frequently used censorship profile, most recently used censorship profile, or the like. In some embodiments, content processing application 117 combines temporal boundaries data 131 and temporal facet data 132 to indicate, on a user interface (not shown), a breakdown of the point-in-time occurrence of various censorship elements 123 in the timeline of the digital content item 130. In some embodiments, the breakdown includes one or more flags indicating where each censorship element 123 occurs within the timeline of the digital content item 130, the percentage of the canon duration of the censorship element 123, the number of total discrete occurrences within the digital content item 130, or the like. In some embodiments, a visualization of the breakdown is dynamically generated and displayed on the user interface. In some embodiments, the visualization of the breakdown includes graphs, charts, statistical analysis data, categories of the elements, or the like.

In step 306, content processing application 117 activates a censorship feature 125 corresponding to at least one censorship element 123 matching a censorship element 123 in censorship profile 120, during playback of the one or more portions the digital content item 130. In some embodiments, content processing application 117 allows a user to determine what action to take in response to the information identifying one or more portions of the digital content item 130 containing an element matching each censorship element 123 in censorship profile 120. In another instance, content processing application 117 can include functionality to allow a user to interactively make selections of what censorship features 125 to activate during playback of the one or more portions of the digital content item 130.

In some embodiments, content processing application 117 can interactively obtain sensor information during playback of the digital content item 130, and determine whether to query the user to determine whether the corresponding portions of the digital content item 130 contain one or more additional censorship elements 123, whether to match an element contained in the corresponding portion of the digital content item 130 to a censorship element 123 already included in censorship profile 120, whether to activate one or more censorship features 125 corresponding to the one or more censorship elements 123, or the like. Content processing application 117 can then playback one or more portions of the digital content item 130 based on the user's input.

Figure 4A:
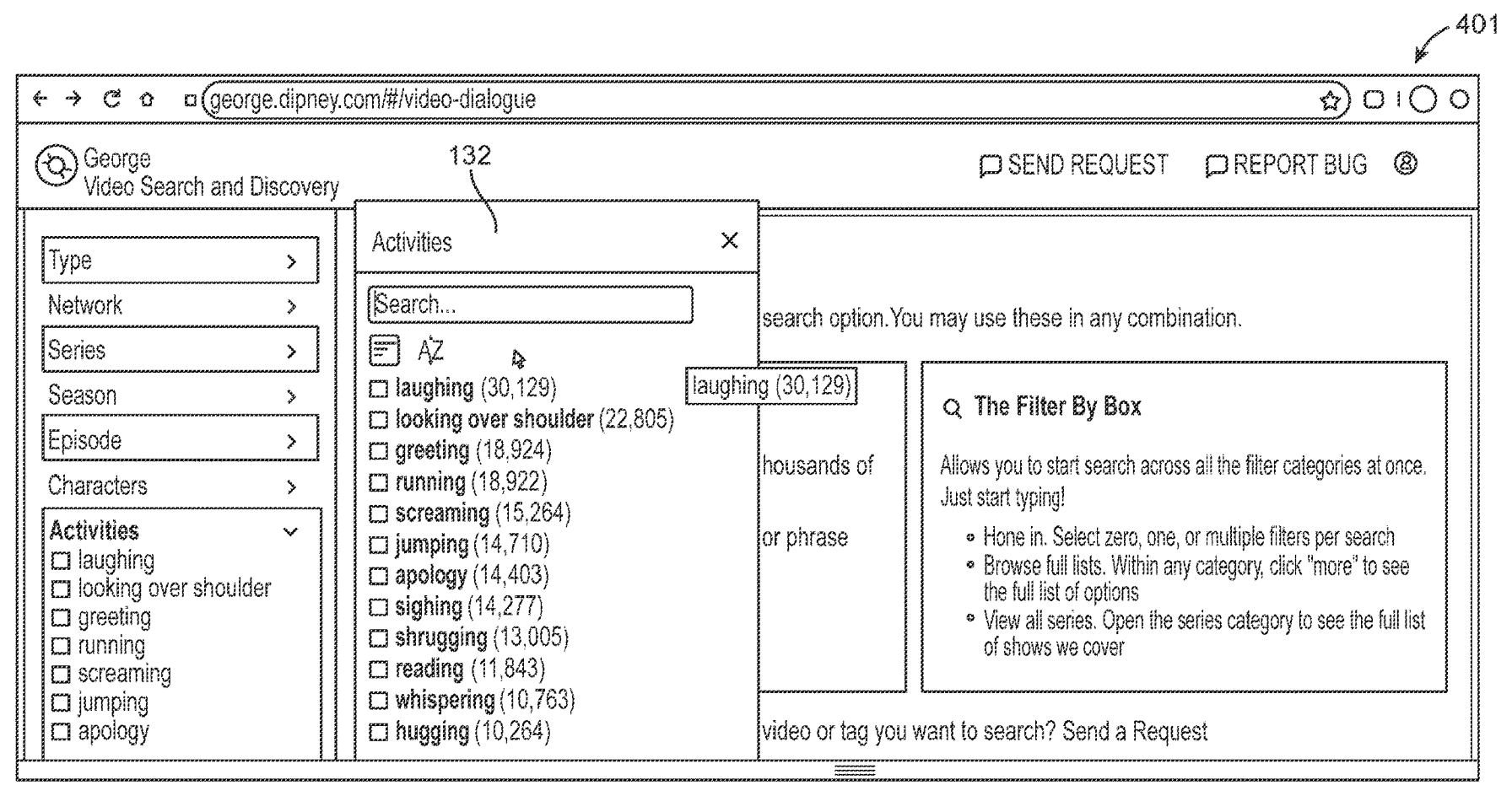

FIG. 4A is an example user interface 401 for personalizing censorship of digital content, according to various embodiments of the present disclosure. As illustrated in FIG. 4A, user interface 401 provides functionality for filtering digital content items 130 based on temporal facet data 132 or the like. In some embodiments, temporal facet data 132 includes metadata, annotations, transcripts, or the like associated with the content appearing in a point-in-time or timecode (e.g., frame) in the digital content item 130. In one instance, temporal facet data 132 includes data associated with activities such as laughing, looking over shoulders, greeting, running, screaming, jumping, apology, sighing, shrugging, reading, whispering, hugging, or the like.

Figure 4B:
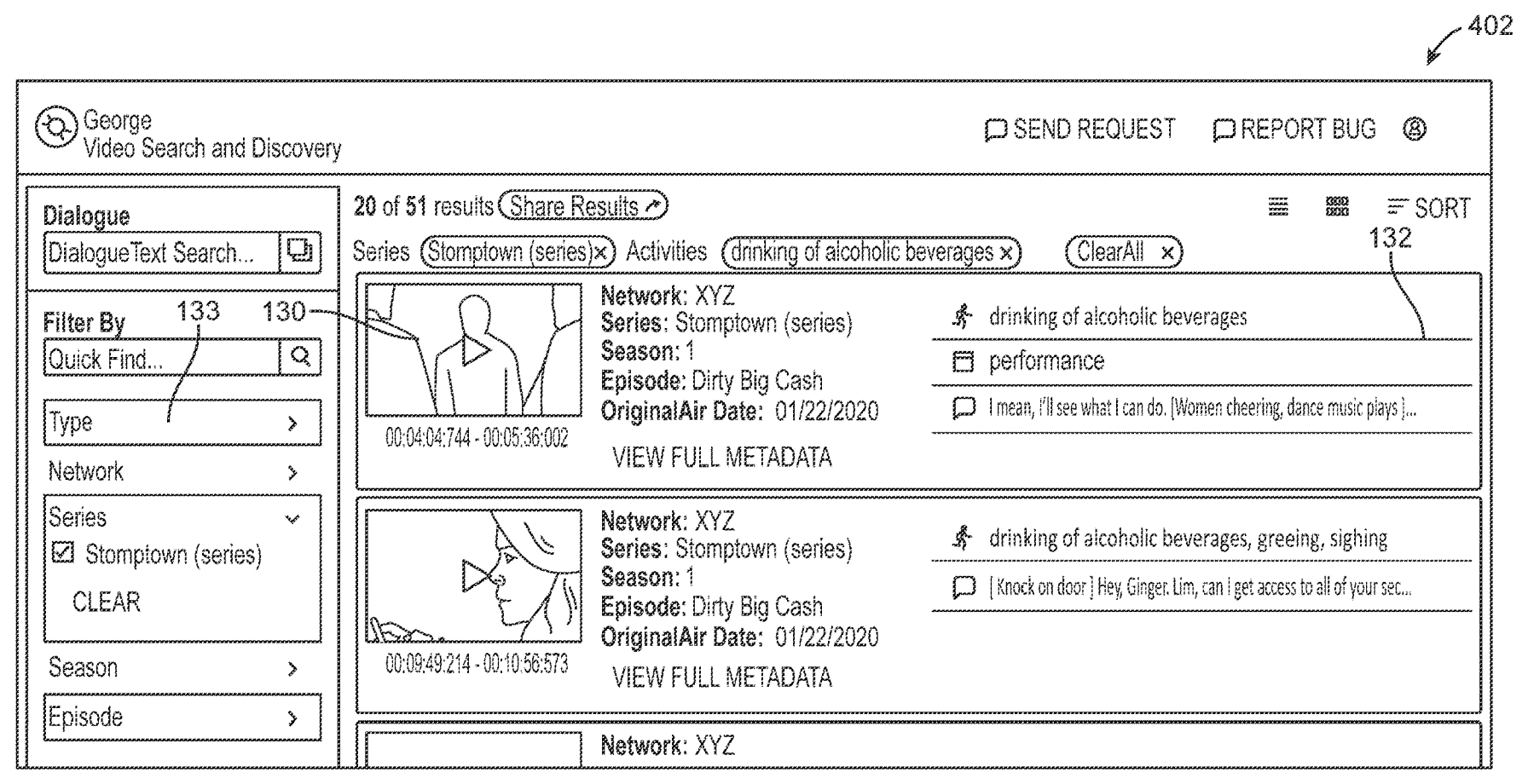

FIG. 4B is an example user interface 402 for personalizing censorship of digital content, according to various embodiments of the present disclosure. As illustrated in FIG. 4B, user interface 402 provides functionality for filtering digital content items 130 based on content category 133 or the like. Content category 133 can include classification of the digital content based on genre, title-level metadata, frame-level metadata, scene-level metadata, or the like. In one instance, content category 133 can include classification of digital content items 130 based on the type of show, network, series, season, episode, characters, or the like. In another instance, a user can view temporal facet data 132 associated with each digital content item 130, including any metadata such as a transcript of the digital content item 130, activities included in the digital content item 130, or the like.

Figure 4C:
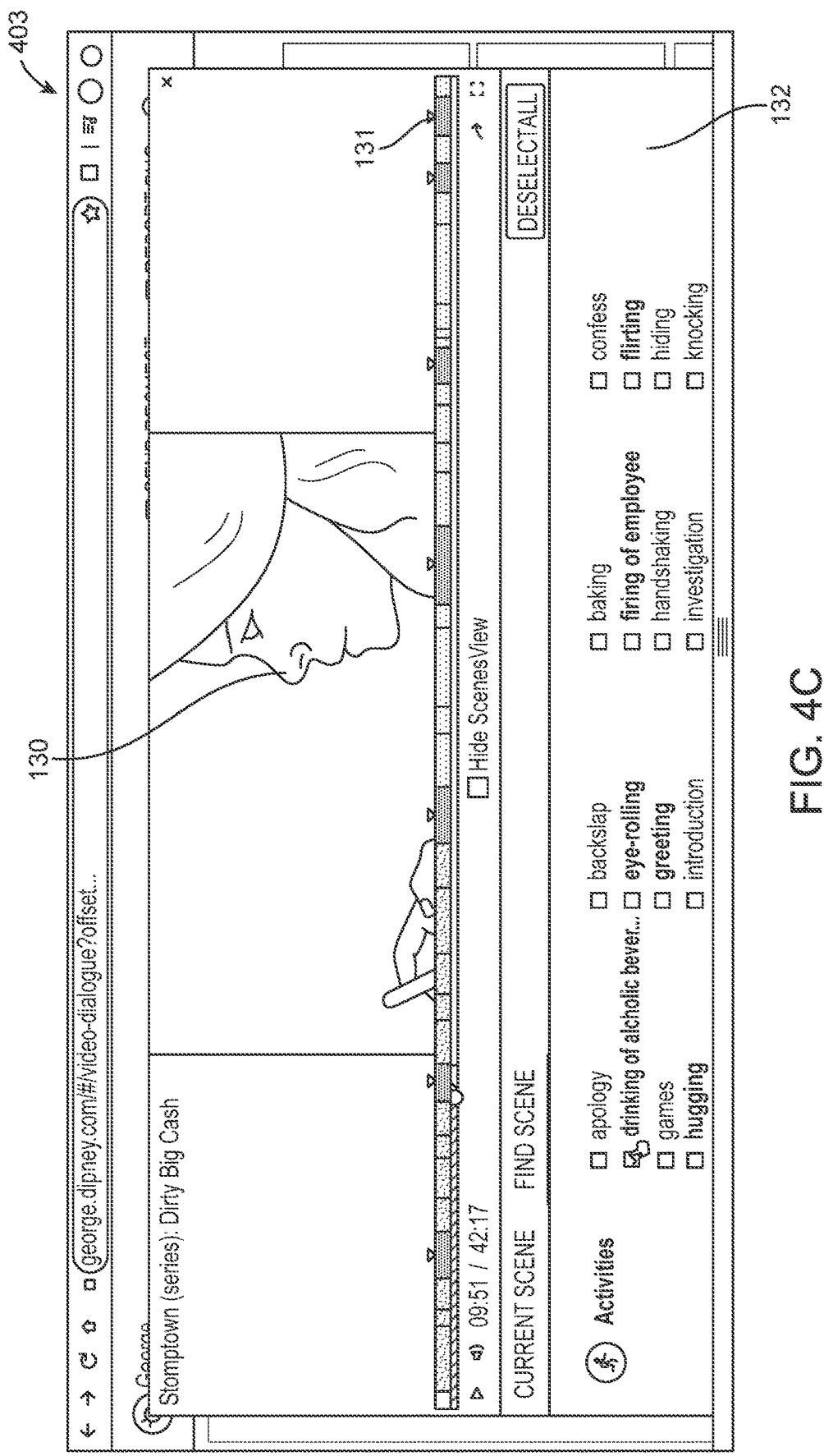
FIG. 4C is an example user interface for personalizing censorship of digital content, according to various embodiments of the present disclosure.

FIG. 4C is an example user interface 403 for personalizing censorship of digital content, according to various embodiments of the present disclosure. As illustrated in FIG. 4C, user interface 403 provides functionality for viewing, for a selected digital content item 130, the temporal boundaries data 131 and the temporal facet data 132. In some embodiments, user interface 403 provides functionality for viewing temporal facet data 132 for a current scene, or the like. In other embodiments, a user can view temporal boundaries data 131, including an indication of the one or more portions of the digital content item 130 that contain one or more elements included in temporal facet data 132. In some embodiments, user interface 403 provides a breakdown of the point-in-time occurrence of temporal facet data 132 in the timeline of the digital content item 130. In some embodiments, the breakdown includes one or more flags 411 indicating where a selected element corresponding to the temporal facet data 132 occurs within the timeline of the digital content item 130, the duration 412 of the censorship element 123 (such as 09:51 minutes out of a total of 42:17 minutes of the digital content item 130), the number of total discrete occurrences within the digital content item 130 (such as seven discrete occurrences highlighted in the timeline of the digital content item 130), or the like.

In sum, personal censorship application 115 generates a censorship profile 120 based on one or more user characteristics 121. User characteristics 121 include a user's age, sex, language preferences, geographical location, demographic information, user biometric information, user content viewing preferences, user content viewing history, user household information, user social media history, or the like. In some instances, user characteristics 121 includes a grouping or segmentation of the user based on a combination of demographic information associated with similarly situated users, such as age, sex, or the like. In other instances, user characteristics 121 includes predicted demographic information associated with the user and an associated weight, score, probability value, or the like corresponding to a confidence level associated with the prediction.

Content processing application 117 applies censorship profile 120 to playback of the digital content items 130. Content processing application 117 allows a user to select a digital content item 130 for playback. Content processing application 117 loads temporal boundaries data 131 and temporal facet data 132 for the selected digital content item 130. Content processing application 117 determines whether censorship profile 120 is available for the user. Content processing application 117 provides the user an option for creating censorship profile 120. Content processing application 117 identifies one or more portions of the digital content item 130 containing an element matching one or more censorship elements 123 in censorship profile 120. Content processing application 117 activates a censorship feature 125 corresponding to each censorship element 123 during playback of the one or more portions of the digital content item 130.

At least one technical advantage of the disclosed techniques relative to the prior art is that the disclosed techniques enable improved censorship of digital content by generating and maintaining customized censorship profiles for users that match their individual needs, preferences, judgement, or the like. Disclosed techniques provide users with an efficient and effective means for fine-tuning their censorship preferences to their unique viewership needs. Disclosed techniques enable granular control over censorship of one or more portions of a digital content item containing offensive or unsuitable material identified in a user's censorship profile. Disclosed techniques create an individualized and optimized viewing experience for users by dynamically applying user-specific censorship features during playback of one or more portions of a digital content item containing offensive or unsuitable material identified in a user's censorship profile. These technical advantages provide one or more technological advancements over prior art approaches.

1. In some embodiments, a computer-implemented method for personalizing censorship of digital content comprises: generating, based on a user characteristic, a censorship profile associated with a user, wherein the censorship profile identifies a censorship element; determining a censorship feature associated with the censorship element, wherein the censorship feature is to be activated during playback of digital content that includes the censorship element; identifying, based on temporal boundaries data and temporal facet data associated with a digital content item, one or more portions of the digital content item that include at least one element matching the censorship element; and activating the censorship feature during playback of the one or more portions of the digital content item.
2. The computer-implemented method of clause 1, further comprising: identifying one or more smart groups of users based on the user characteristic; and modifying, based on the one or more smart groups, one or more attributes of the censorship element.
3. The computer-implemented method of clauses 1 or 2, wherein the one or more smart groups are generated based on one or more predictions of censorship selections for one or more users associated with the user characteristic.
4. The computer-implemented method of any of clauses 1-3, further comprising: modifying, based on user input, a user-specific importance rating and the censorship feature associated with the censorship element.
5. The computer-implemented method of any of clauses 1-4, further comprising: identifying, based on user input, a second censorship feature to activate during playback of digital content that includes the censorship element.
6. The computer-implemented method of any of clauses 1-5, wherein the censorship feature includes at least one of: alert, flag, auto-pause, auto-skip, auto-black out, or auto-muting audio.
7. The computer-implemented method of any of clauses 1-6, wherein the censorship feature is activated within a predefined timeframe of the censorship element being displayed.
8. The computer-implemented method of any of clauses 1-7, wherein the censorship profile is updated in a real time manner during playback of the one or more portions of the digital content item.
9. The computer-implemented method of any of clauses 1-8, further comprising: generating a preview of the one or more portions of the digital content item that include at least one element matching the censorship element.
10. In some embodiments, one or more non-transitory computer readable media store instructions that, when executed by one or more processors, cause the one or more processors to perform the steps of: generating, based on a user characteristic, a censorship profile associated with a user, wherein the censorship profile identifies a censorship element; determining a censorship feature associated with the censorship element, wherein the censorship feature is to be activated during playback of digital content that includes the censorship element; identifying, based on temporal boundaries data and temporal facet data associated with a digital content item, one or more portions of the digital content item that include at least one element matching the censorship element; and activating the censorship feature during playback of the one or more portions of the digital content item.
11. The one or more non-transitory computer readable media of clause 10, further comprising: identifying one or more smart groups of users based on the user characteristic; and modifying, based on the one or more smart groups, one or more attributes of the censorship element.
12. The one or more non-transitory computer readable media of clauses 10 or 11, wherein the one or more smart groups are generated based on one or more predictions of censorship selections for one or more users associated with the user characteristic.
13. The one or more non-transitory computer readable media of any of clauses 10-12, further comprising: modifying, based on user input, a user-specific importance rating and the censorship feature associated with the censorship element.
14. The one or more non-transitory computer readable media of any of clauses 10-13, further comprising: identifying, based on user input, a second censorship feature to activate during playback of digital content that includes the censorship element.
15. The one or more non-transitory computer readable media of any of clauses 10-14, wherein the censorship feature includes at least one of: alert, flag, auto-pause, auto-skip, auto-black out, or auto-muting audio.
16. The one or more non-transitory computer readable media of any of clauses 10-15, wherein the censorship feature is activated within a predefined timeframe of the censorship element being displayed.
17. The one or more non-transitory computer readable media of any of clauses 10-16, wherein the censorship profile is updated in a real time manner during playback of the one or more portions of the digital content item.
18. The one or more non-transitory computer readable media of any of clauses 10-17, further comprising: generating a preview of the one or more portions of the digital content item that include at least one element matching the censorship element.
19. In some embodiments, a system comprises: a memory storing one or more software applications; and a processor that, when executing the one or more software applications, is configured to perform the steps of: generating, based on a user characteristic, a censorship profile associated with a user, wherein the censorship profile identifies a censorship element; determining a censorship feature associated with the censorship element, wherein the censorship feature is to be activated during playback of digital content that includes the censorship element; identifying, based on temporal boundaries data and temporal facet data associated with a digital content item, one or more portions of the digital content item that include at least one element matching the censorship element; and activating the censorship feature during playback of the one or more portions of the digital content item.

20. The system of clause 19, wherein the processor is further configured to perform the steps of: identifying one or more smart groups of users based on the user characteristic; and modifying, based on the one or more smart groups, one or more attributes of the censorship element.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for personalizing censorship of digital content, the method comprising:
    generating, based on a user characteristic, a censorship profile associated with a user, wherein the censorship profile identifies a censorship element, and the censorship element indicates at least one of an evaluation, rating, classification, flagging, tagging, restriction, exemption, or prohibition of content;
    identifying one or more smart groups of users based on the user characteristic, wherein each smart group is created based on at least one of one or more rules or one or more criteria;
    modifying one or more attributes of the censorship element based on a comparison with a corresponding censorship element in the one or more smart groups;
    determining a censorship feature associated with the censorship element, wherein the censorship feature is to be activated during playback of digital content that includes the censorship element;
    identifying, based on temporal boundaries data and temporal facet data associated with a digital content item, one or more portions of the digital content item that include at least one element matching the censorship element; and
    activating the censorship feature during playback of the one or more portions of the digital content item.

2. The computer-implemented method of claim 1, wherein the one or more smart groups are created based on one or more predictions of censorship selections for one or more users associated with the user characteristic.

3. The computer-implemented method of claim 1, further comprising:
modifying, based on user input, a user-specific importance rating and the censorship feature associated with the censorship element.

4. The computer-implemented method of claim 1, further comprising:
identifying, based on user input, a second censorship feature to activate during playback of digital content that includes the censorship element.

5. The computer-implemented method of claim 1, wherein the censorship feature includes at least one of: alert, flag, auto-pause, auto-skip, auto-black out, or auto-muting audio.

6. The computer-implemented method of claim 1, wherein the censorship feature is activated within a predefined timeframe of the censorship element being displayed.

7. The computer-implemented method of claim 1, wherein the censorship profile is updated in a real time manner during playback of the one or more portions of the digital content item.

8. The computer-implemented method of claim 1, further comprising:
generating a preview of the one or more portions of the digital content item that include at least one element matching the censorship element.

9. The computer-implemented method of claim 1, further comprising receiving, based on user input, a selection of the one or more smart groups.

10. One or more non-transitory computer readable media storing instructions that, when executed by one or more processors, cause the one or more processors to perform the steps of:
generating, based on a user characteristic, a censorship profile associated with a user, wherein the censorship profile identifies a censorship element, and the censorship element indicates at least one of an evaluation, rating, classification, flagging, tagging, restriction, exemption, or prohibition of content;
identifying one or more smart groups of users based on the user characteristic, wherein each smart group is created based on at least one of one or more rules or one or more criteria;
modifying one or more attributes of the censorship element based on a comparison with a corresponding censorship element in the one or more smart groups;
determining a censorship feature associated with the censorship element, wherein the censorship feature is to be activated during playback of digital content that includes the censorship element;
identifying, based on temporal boundaries data and temporal facet data associated with a digital content item, one or more portions of the digital content item that include at least one element matching the censorship element; and
activating the censorship feature during playback of the one or more portions of the digital content item.

11. The one or more non-transitory computer readable media of claim 10, wherein the one or more smart groups are created based on one or more predictions of censorship selections for one or more users associated with the user characteristic.

12. The one or more non-transitory computer readable media of claim 10, wherein the instructions, when executed by the one or more processors, further cause the one or more processors to perform the steps of:
modifying, based on user input, a user-specific importance rating and the censorship feature associated with the censorship element.

13. The one or more non-transitory computer readable media of claim 10, wherein the instructions, when executed by the one or more processors, further cause the one or more processors to perform the step of:
identifying, based on user input, a second censorship feature to activate during playback of digital content that includes the censorship element.

14. The one or more non-transitory computer readable media of claim 10, wherein the censorship feature includes at least one of: alert, flag, auto-pause, auto-skip, auto-black out, or auto-muting audio.

15. The one or more non-transitory computer readable media of claim 10, wherein the censorship feature is activated within a predefined timeframe of the censorship element being displayed.

16. The one or more non-transitory computer readable media of claim 10, wherein the censorship profile is updated in a real time manner during playback of the one or more portions of the digital content item.

17. The one or more non-transitory computer readable media of claim 10, wherein the instructions, when executed by the one or more processors, further cause the one or more processors to perform the step of:
generating a preview of the one or more portions of the digital content item that include at least one element matching the censorship element.

18. A system, comprising:
a memory storing one or more software applications; and
a processor that, when executing the one or more software applications, is configured to perform the steps of:
generating, based on a user characteristic, a censorship profile that is personalized for a user, wherein the censorship profile identifies a censorship element, and the censorship element indicates at least one of an evaluation, rating, classification, flagging, tagging, restriction, exemption, or prohibition of content,
identifying one or more smart groups of users based on the user characteristic, wherein each smart group is created based on at least one of one or more rules or one or more criteria,
modifying one or more attributes of the censorship element based on a comparison with a corresponding censorship element in the one or more smart groups,
determining a censorship feature associated with the censorship element, wherein the censorship feature is to be activated during playback of digital content that includes the censorship element,
identifying, based on temporal boundaries data and temporal facet data associated with a digital content item, one or more portions of the digital content item that include at least one element matching the censorship element, and
activating the censorship feature during playback of the one or more portions of the digital content item.

* * * * *